(12) United States Patent
Sekiguchi et al.

(10) Patent No.: US 11,415,746 B2
(45) Date of Patent: Aug. 16, 2022

(54) SENSOR

(71) Applicant: FUTABA CORPORATION, Mobara (JP)

(72) Inventors: Sho Sekiguchi, Mobara (JP); Yasuo Ishiwata, Mobara (JP)

(73) Assignee: FUTABA CORPORATION, Mobara (JP)

( * ) Notice: Subject to any disclaimer, the term of this patent is extended or adjusted under 35 U.S.C. 154(b) by 8 days.

(21) Appl. No.: 17/102,492

(22) Filed: Nov. 24, 2020

(65) Prior Publication Data

US 2021/0165161 A1 Jun. 3, 2021

(30) Foreign Application Priority Data

Dec. 3, 2019 (JP) .............................. JP2019-218857

(51) Int. Cl.
*G02B 6/12* (2006.01)
*G02B 6/38* (2006.01)

(52) U.S. Cl.
CPC ........... *G02B 6/1203* (2013.01); *G02B 6/389* (2013.01); *G02B 2006/12138* (2013.01)

(58) Field of Classification Search
CPC .................. G02B 6/1203; G02B 6/389; G02B 2006/12138
See application file for complete search history.

(56) References Cited

U.S. PATENT DOCUMENTS

| 4,136,566 A * | 1/1979 | Christensen ........... G01K 11/18 374/161 |
| 6,345,974 B1 * | 2/2002 | Kawasaki ............. B29C 45/401 425/149 |
| 2014/0186487 A1 * | 7/2014 | Tanaka .................. B29C 45/401 425/556 |

FOREIGN PATENT DOCUMENTS

JP S58-137721 A * 8/1983

* cited by examiner

*Primary Examiner* — Sung H Pak
(74) *Attorney, Agent, or Firm* — Bacon & Thomas, PLLC

(57) ABSTRACT

A sensor installed into a mold including a cable insertion member having a fixing portion with a fitting recess is provided. The sensor includes an optical fiber a part of which is bendable, and a fiber holder having a fiber insertion portion through which the optical fiber is inserted and a to-be-fixed portion extending from the fiber insertion portion. Further, the to-be-fixed portion is fixed to the fixing portion while being fitted to the fitting recess.

8 Claims, 8 Drawing Sheets

SENSOR

TECHNICAL FIELD

The present disclosure relates to a sensor using an optical fiber that is installed into a mold.

BACKGROUND

A sensor for measuring temperature and pressure in a cavity is installed into a mold for forming a resin-molded product. As an example of a temperature sensor for measuring the temperature of a resin in a cavity, there is known a sensor for transmitting infrared rays emitted from the resin to a detector through an optical fiber inserted into an insertion member communicating with the cavity.

As an example of a sensor using an optical fiber, there is known a sensor installed into a mold and using a hollow ejector pin as an insertion member (see, e.g., Japanese Patent Application Publication No. S58-137721). In the sensor disclosed in Japanese Patent Application Publication No. S58-137721 that is an infrared temperature measuring device, a part of the optical fiber is bent to prevent the optical fiber from being damaged when there is an impact to the ejector pin due to the movement of the ejector pin (protruding pin).

As described above, in the sensor using an optical fiber, a part of the optical fiber is generally bent to avoid contact with another part.

However, in the sensor in which the optical fiber is bent, a force in a twisting direction may be generated in the optical fiber due to the movement of the ejector pin. Consequently, stress may be concentrated on the bending portion of the optical fiber due to the twisting of the optical fiber, which may damage the optical fiber.

SUMMARY

In view of the above, the present disclosure provides a technique for preventing damage due to the twisting of an optical fiber.

In accordance with an aspect of the present disclosure, there is provided a sensor installed into a mold including a cable insertion member having a fixing portion with a fitting recess, the sensor including: an optical fiber, a part of which is bendable; and a fiber holder having a fiber insertion portion through which the optical fiber is inserted and a to-be-fixed portion extending from the fiber insertion portion. Further, the to-be-fixed portion is fixed to the fixing portion while being fitted to the fitting recess.

Accordingly, the fiber holder is less likely to be deformed in the twisting direction of the optical fiber.

Further, in the sensor described above, the fiber insertion portion and the to-be-fixed portion may be integrally formed.

Accordingly, the fiber holder is formed as a single member, and a dedicated member through which the optical fiber is inserted and a dedicated member fixed to the fixing portion are not required.

Alternatively, in the sensor described above, the fiber insertion portion and the to-be-fixed portion may be provided as separate members, and the fiber insertion portion is joined to the to-be-fixed portion.

Accordingly, the fiber holder is formed by assembling the fiber insertion portion and the to-be-fixed portion.

Further, in the sensor described above, the fitting recess may have two flat side surfaces facing each other and a bottom surface having both edges extending from the two side surfaces, and the to-be-fixed portion may have two flat surfaces. The two side surfaces may be in contact with the two flat surfaces, respectively.

Accordingly, the contact area between the to-be-fixed portion and the fixing portion is increased.

Further, in the sensor described above, the to-be-fixed portion may have an engagement surface, and the fixing portion may have a screw hole that extends and is open toward one of the two side surfaces. The to-be-fixed portion may be fixed to the fixing portion by pressing a screw member screwed into the screw hole against the engagement surface.

Accordingly, the screw member is pressed against the engagement surface, so that the to-be-fixed portion is pressed against the fixing portion.

Further, in the sensor described above, the engagement surface may be sloped to be close to one of the two side surfaces, as the engagement surface slopes toward the bottom surface in a state where the to-be-fixed portion is fitted to the fitting recess.

Accordingly, the screw member is pressed against the sloped engagement surface, so that the to-be-fixed portion is pressed against the other one of the two side surfaces and the bottom surface.

Further, in the sensor described above, an ejector pin may be used as the cable insertion member.

Accordingly, the fiber holder is formed as a single member, and the ejector pin functions as the cable insertion member.

In accordance with the aspect of the present disclosure, the to-be-fixed portion is fixed into the fitting recess while being fitted in the fitting recess. Therefore, the fiber holder is less likely to be deformed in the twisting direction of the optical fiber, so that damage caused by the twisting of the optical fiber can be prevented.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments for implementing a sensor of the present disclosure will be described with reference to the accompanying drawings (FIGS. 1 to 9).

Configuration of Mold

Figure 1:
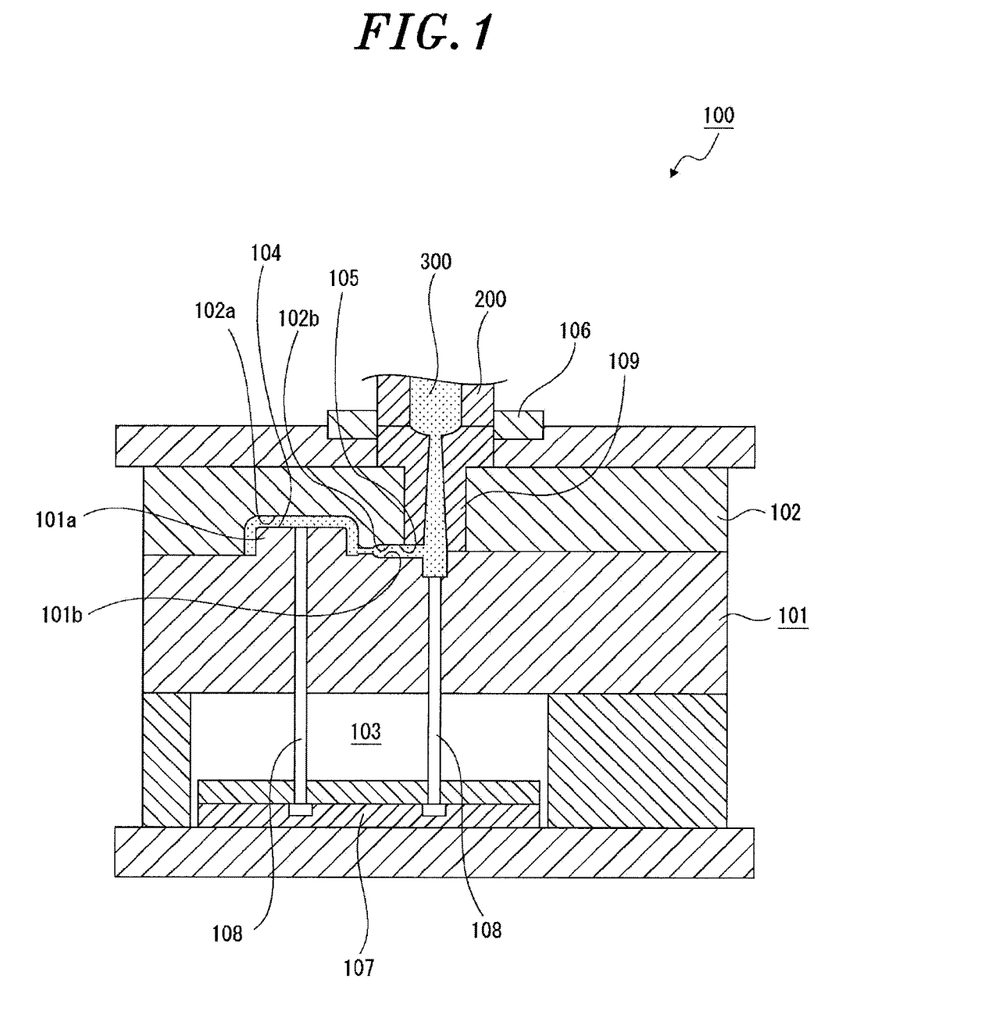
FIG. 1 is a cross-sectional view of an example of an injection mold where a sensor is used and shows an embodiment of the present disclosure together with FIGS. 2 to 9.

First, a configuration of a mold where a sensor is used will be described with reference to FIG. 1.

In the following description, forward/backward, up/down (vertical), and left/right directions are defined on the assumption that the direction in which a movable element and a fixed element of the mold are connected to and separated from each other is defined as the up/down direction. However, these directions are defined only for the sake of convenience of description, and the implementation of the present disclosure is not limited by these directions.

A mold 100 has, e.g., a function of a cold runner, and includes a movable element 101 and a fixed element 102 that are separably connected to each other in the up/down direction and assembled as a part of an injection molding machine. The movable element 101 has an inner space serving as an arrangement space 103. At a lower portion of the fixed mold 102, a recess 102*a* that is open downward and a runner recess 102*b* are formed continuously in the left/right direction.

The movable element 101 has a protrusion 101*a* on an upper surface thereof. The movable element 101 has a runner recess 101*b* that is open upward and extends from the side portion of the protrusion 101*a*. A cavity 104 is formed by the protrusion 101*a* and the recess 102*a* in a state where the movable element 101 and the fixed element 102 are in contact with each other, and a runner 105 is formed by the runner recess 101*b* and the runner recess 102*b*.

The fixed element 102 has a locating ring 106 disposed at an upper center surface thereof, and a supply nozzle 200 for supplying molten resin is installed through the locating ring 106.

A driving plate 107 configured to be movable in the up/down direction is disposed in the arrangement space 103 of the movable element 101, and lower ends of ejector pins 108 are connected to the driving plate 107.

Each ejector pin 108 serves as a cable insertion member, and a part of an optical fiber of a sensor to be described later is inserted into the ejector pin 108. One end of the sensor inserted into the ejector pin 108 is located near the cavity 104.

A sprue 109 communicating with the runner 105 is disposed at a central portion of the fixed element 102, and a supply nozzle 200 is coupled to the sprue 109.

When the cavity 104 is formed by the contact between the movable element 101 and the fixed element 102, a molten resin 300 is supplied from the supply nozzle 200 to the cavity 104 through the sprue 109 and the runner 105.

When the cavity 104 is filled with the molten resin 300, the supply nozzle 200 is closed and the supply of the molten resin 300 is stopped. When a certain period of time elapses from the time at which the supply of the molten resin 300 is stopped, the molten resin 300 filling the cavity 104 is cooled and solidified. Thus, a molded product is formed. When the molded product is formed, the movable element 101, together with the molded product, is moved downward and separated from the fixed element 102. Then, the molded product is taken out from the cavity 104 by the ejector pins 108.

Configurations of the Sensor and the Cable Insertion Member

Next, specific configurations of the sensor and the ejector pin 108 serving as the cable insertion member will be described with reference to FIGS. 2 to 8.

In the following description, the forward/backward, up/down, and left/right directions are defined on the assumption that the extending directions of the respective portions of the bent optical fiber are defined as the forward/backward direction and the up/down direction. However, these directions are defined only for the sake of convenience of description, and the implementation of the present disclosure is not limited by these directions.

Figure 2:
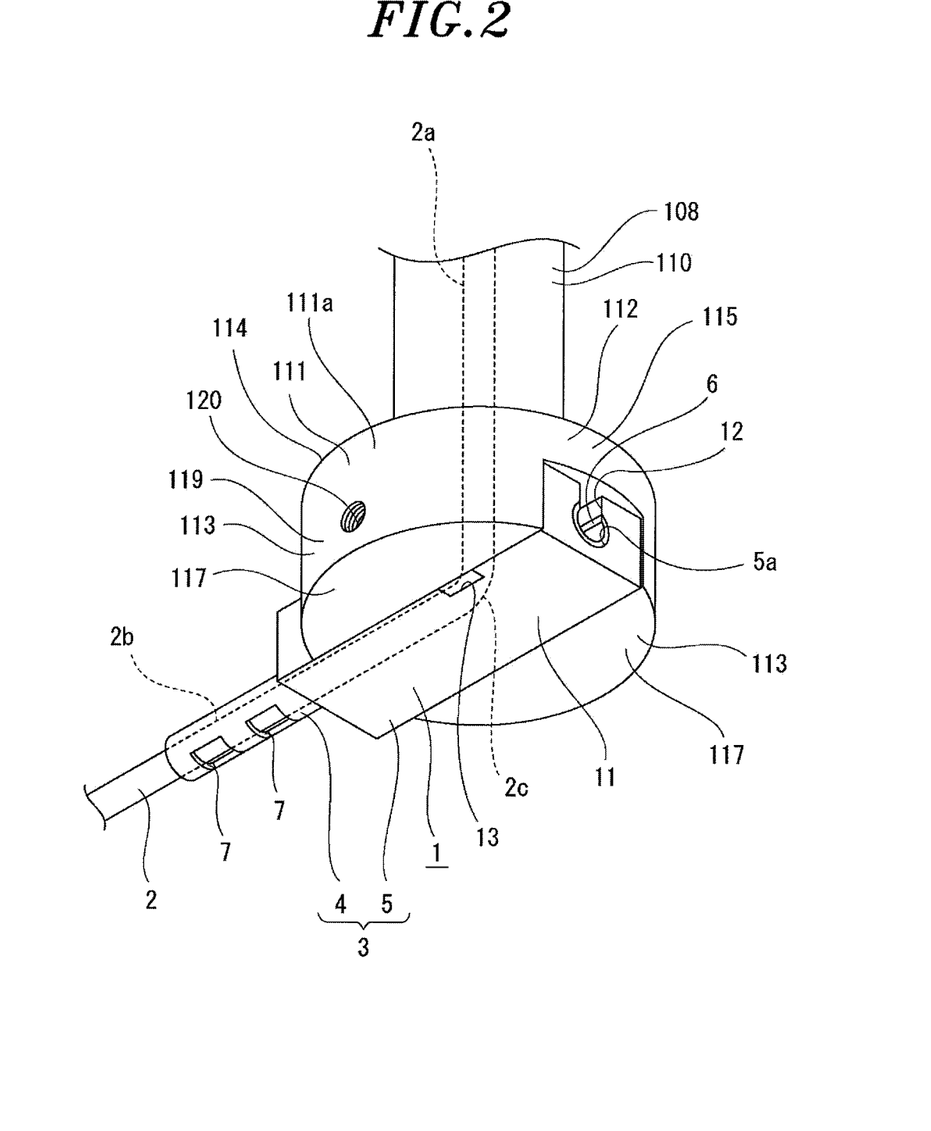
FIG. 2 is a perspective view showing a state in which the sensor is fixed to an ejector pin.
Figure 3:
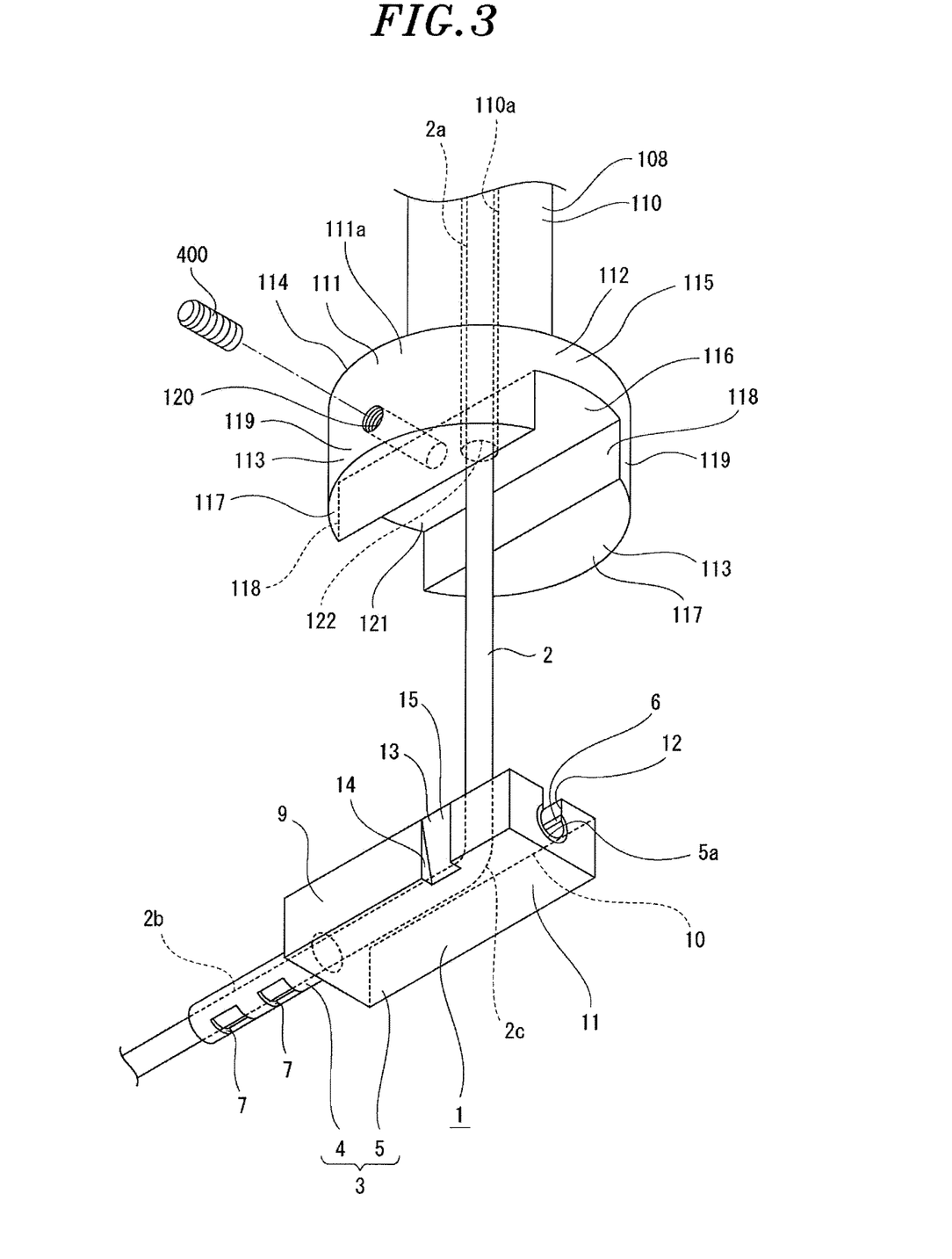
FIG. 3 is an exploded view showing the sensor and the ejector pin.

Each ejector pin 108 includes a cylindrical sleeve portion 110 whose axial direction coincides with the up/down direction, and a fixing portion 111 connected to a lower end of the sleeve portion 110 (see FIGS. 2 and 3).

An inner space of the sleeve portion 110 serves as a fiber insertion hole 110*a*.

The fixing portion 111 has an outer peripheral surface 111*a* formed in a cylindrical surface shape having cutoff portions, a thin cylindrical base portion 112 whose axial direction coincides with the up/down direction, and protruding portions 113 formed at both sides of the left/right direction of the base portion 112 to protrude downward from the both sides.

The base portion 112 has a circular sleeve coupling surface 114 as an upper surface thereof. A portion of the outer peripheral surface 111*a* corresponding to an outer peripheral surface of the base portion 112 serves as a base peripheral surface 115. A surface of the base portion 112 between the two protruding portions 113 serves as a bottom surface 116. A sleeve portion 110 is coupled to a central portion of the sleeve coupling surface 114.

Bottom surfaces of the protruding portions 113 serve as end surfaces 117. Surfaces between the bottom surface 116 and the end surfaces 117 serve as side surfaces 118 facing each other in the left/right direction. Portions of the outer peripheral portion 111*a* corresponding to outer peripheral surfaces of the protruding portions 113 serve as protruding portion peripheral surfaces 119. The protruding portions 113 are symmetrical with respect to the bottom surface 116.

One of the protruding portions 113 has a screw hole 120 formed to extend from the side surface 118 to the protruding portion peripheral surface 119. A screw member 400 is screwed into the screw hole 120.

The space in the fixing portion 111, which is surrounded by the bottom surface 116 and the side surfaces 118, serves as a fitting recess 121. The fitting recess 121 is open downward and also opened in the forward/backward direction. A communication hole 122 communicating with the fiber insertion hole 110*a* of the sleeve portion 110 is formed at a central portion of the bottom surface 116. Therefore, the fitting recess 121 and the fiber insertion hole 110*a* communicate with each other through the communication hole 122.

The sensor 1 is configured to detect the state of the molten resin 300 in the cavity 104. Specifically, for example, the sensor 1 is used as a temperature sensor for sensing the temperature of the molten resin 300 and also used as a flow front sensor for detecting a flow front position of the molten resin 300 in the cavity 104.

Figure 4:
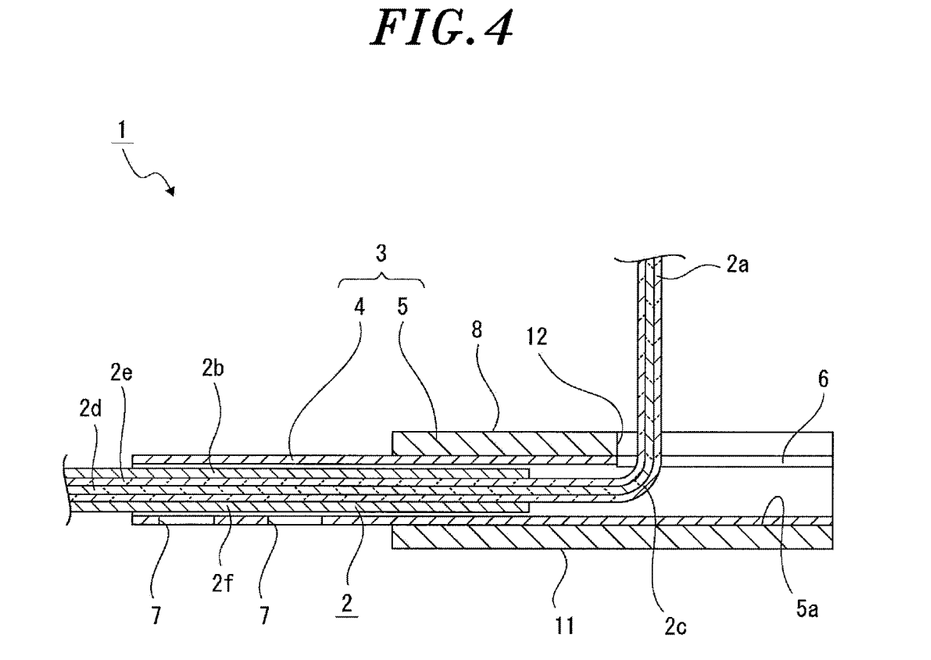
FIG. 4 is a cross-sectional view of the sensor.

The sensor 1 includes a bendable optical fiber 2 and a fiber holder 3 for holding the optical fiber 2 (see FIGS. 2 to 4). The fiber holder 3 has a fiber insertion portion 4 through which the optical fiber 2 is inserted and a to-be-fixed portion 5 extending from the fiber insertion portion 4.

The optical fiber 2 has a first portion 2a inserted into the ejector pin 108, a second portion 2b inserted into the fiber insertion portion 4 while being bent in a direction substantially perpendicular to the first portion 2a, and a bending portion 2c between the first portion 2a and the second portion 2b. The first portion 2a extends in the up/down direction, and the second portion 2b extends in the forward/backward direction. A detection unit (not shown) is disposed at one end of the first portion 2a opposite to the other end connected to the second portion 2b, and a light receiver (not shown) for receiving light detected by the detection unit is connected to one end of the second portion 2b opposite to the other end connected to the first portion 2a.

The optical fiber 2 is configured to have a structure of a core portion 2d serving as a core, a clad portion 2e that covers an outer periphery of the core portion 2d, and a coating portion 2f that covers an outer periphery of the clad portion 2e. The core portion 2d and the clad portion 2e are made of, e.g., quartz glass, and the coating portion 2f is made of, e.g., silicon. As for the coating portion 2f, a plurality of coating portions 2f may be laminated in the thickness direction. In the embodiment, a part of the optical fiber 2 is bent, and the coating portion 2f is not provided at the bending portion. Accordingly, good flexibility is ensured.

The fiber insertion portion 4 has a substantially cylindrical shape whose axial direction coincides with the forward/backward direction. At least a part of the fiber insertion portion 4 is located inside the movable element 101. A vertically extending lead-out cutout 6 (cutout for lead-out) is opened at one end of the fiber insertion portion 4 (see FIGS. 4 and 5). Adhesion holes 7 are formed at a portion close to the other end of the fiber insertion portion 4 while being spaced apart from each other in the forward/backward direction. When an adhesive (not shown) is provided through the adhesion holes 7 and 7 in a state where the second portion 2b of the optical fiber 2 is inserted into the fiber insertion portion 4, the coating portion 2f and the fiber insertion portion 4 are adhered to fix the optical fiber 2 to the fiber insertion portion 4.

Figure 5:
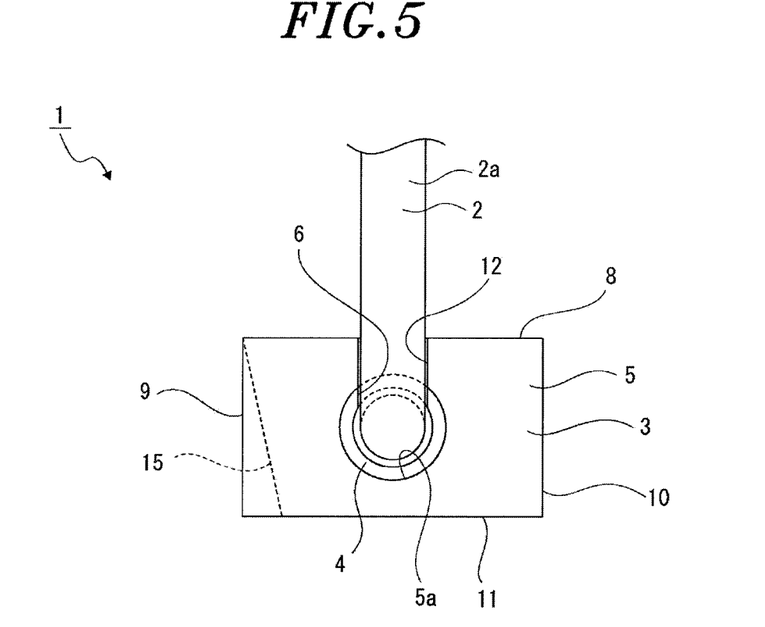
FIG. 5 is a front view of the sensor.

The to-be-fixed portion 5 has a substantially rectangular parallelepiped outer shape whose longitudinal direction coincides with the forward/backward direction. The to-be-fixed portion 5 is fitted to the fitting recess 121 of the fixing portion 111. An upper surface of the to-be-fixed portion 5 serves as a fiber lead-out surface 8. Two surfaces of the to-be-fixed portion 5 facing each other in the left/right direction serve as flat surfaces 9 and 10. A bottom surface of the to-be-fixed portion 5 serves as an exposed surface 11.

An insertion hole 5a is formed through the to-be-fixed portion 5 in the forward/backward direction. A diameter of the insertion hole 5a is substantially the same as an outer diameter of the fiber insertion portion 4. A part of the fiber insertion portion 4 is inserted into the insertion hole 5a to fix the fiber insertion portion 4 to the to-be-fixed portion 5 by means of welding, adhesion, or the like.

The to-be-fixed portion 5 has a cable cutout 12 (cutout for a cable) that is open toward the fiber lead-out surface 8 at one side in the longitudinal direction of the to-be-fixed portion 5 and connected with the insertion hole 5a. In a state where a part of the fiber insertion portion 4 is inserted into the insertion hole 5a, one end of the fiber insertion portion 4 in the axial direction positionally coincides with one end of the to-be-fixed portion 5 in the longitudinal direction, and the lead-out cutout 6 positionally coincides with the cable cutout 12.

Since the lead-out cutout 6 and the cable cutout 12 are formed at the fiber holder 3, the first portion 2a and the bending portion 2c can be inserted into the fiber holder 3 from the front side in a state where the second portion 2b of the optical fiber 2 is inserted into the fiber insertion portion 4. Accordingly, the optical fiber 2 can be easily assembled to the fiber holder 3. Further, instead of the lead-out cutout 6 and the cable cutout 12, a hole through which the optical fiber 2 is inserted may be formed at the fiber insertion portion 4 and the to-be-fixed portion 5.

An engagement groove 13 is formed at the end portion of the to-be-fixed portion 5 on the flat surface 9 side (see FIGS. 3 and 5). The engagement groove 13 is open downward and sideward, and is formed by regulating surfaces 14 that face each other and is perpendicular to the flat surface 9 and an engagement surface 15 having both ends extending from the regulating surfaces 14. The engagement surface 15 is gradually sloped to be close to a flat surface 10 from the fiber lead-out surface 8 toward the exposed surface 11.

In the sensor 1 configured as described above, the fiber insertion portion 4 and the to-be-fixed portion 5 are provided as separate members and joined by means of welding, adhesion, or the like. Since the fiber insertion portion 4 and the to-be-fixed portion 5 are formed separately, it is possible to easily manufacture the fiber holder 3 and improve a degree of freedom in design.

Figure 6:
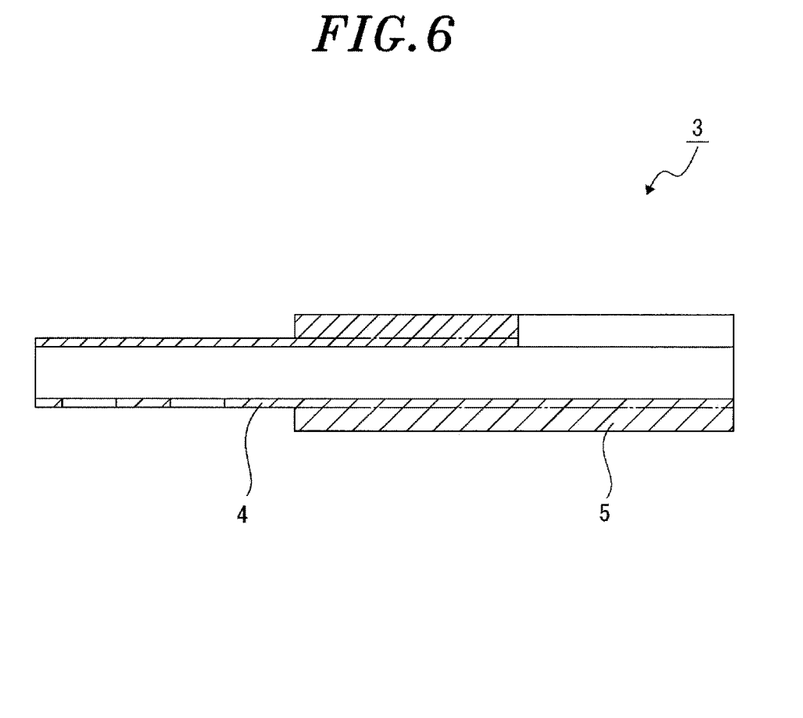
FIG. 6 is a cross-sectional view showing an example in which a fiber insertion portion and a to-be-fixed portion are integrally formed.
Figure 7:
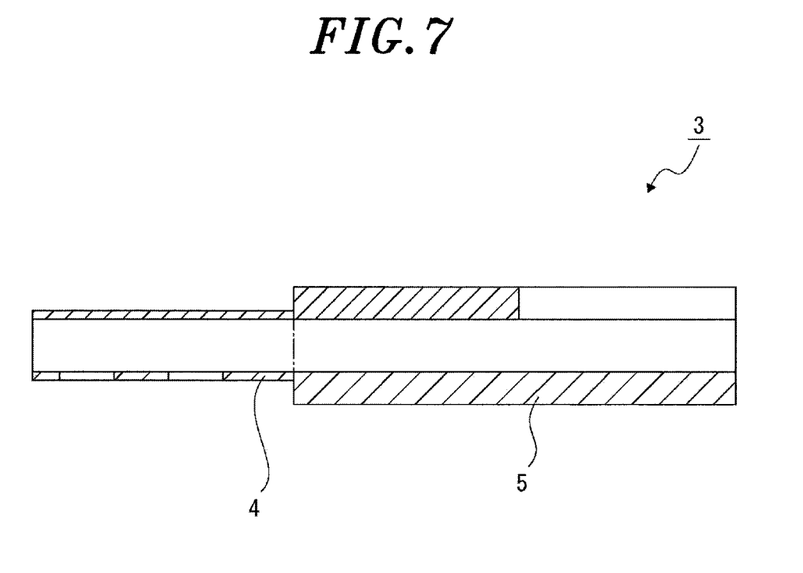
FIG. 7 is a cross-sectional view showing another example in which the fiber insertion portion and the to-be-fixed portion are integrally formed.

However, the fiber holder 3 may be configured by integrally forming the fiber insertion portion 4 and the to-be-fixed portion 5 (see FIGS. 6 and 7). The dashed-dotted lines shown in FIGS. 6 and 7 indicate the boundary line between the fiber insertion portion 4 and the to-be-fixed portion 5. For example, the fiber holder 3 may include a to-be-fixed portion 5 having a substantially rectangular parallelepiped outer shape and a cylindrical fiber insertion portion 4 disposed inside the to-be-fixed portion 5 (see FIG. 6). Alternatively, the fiber holder 3 may include a to-be-fixed portion 5 having a substantially rectangular parallelepiped outer shape and a fiber insertion portion 4 extending from one end surface of the to-be-fixed portion 5 in the longitudinal direction (see FIG. 7).

When the fiber insertion portion 4 and the to-be-fixed portion 5 are integrally formed, a dedicated member through which the optical fiber 2 is inserted and a dedicated member fixed to the fixing portion 111 are not required. Therefore, it is possible to reduce the number of components and increase the strength of the fiber holder 3.

Further, even when the fiber insertion portion 4 and the to-be-fixed portion 5 are formed as separate members, one end surface of the cylindrical fiber insertion portion 4 in the axial direction may be fixed to one end surface of the to-be-fixed portion 5 having a substantially rectangular parallelepiped outer shape in the longitudinal direction by means of welding, adhesion, or the like.

In the sensor 1 configured as described above, the second portion 2b of the optical fiber 2 is inserted into the fiber insertion portion 4; the bending portion 2c is disposed near the lead-out cutout 6 and the cable cutout 12; and the first portion 2a is held by the fiber holder 3 while being led out from the fiber lead-out surface 8.

The sensor 1 is fixed to the fixing portion 111 by means of welding, adhesion, or the like, while the first portion 2a of the optical fiber 2 is inserted into the fiber insertion hole 110a of the sleeve portion 110 through the communication hole 122 and the to-be-fixed portion 5 is fitted to the fitting recess 121.

At this time, the to-be-fixed portion 5 is fitted to the fitting recess 121 in a state where the flat surfaces 9 and 10 of the to-be-fixed portion 5 are in contact with the side surfaces 118 of the fitting recess 121. Therefore, the contact area between the to-be-fixed portion 5 and the fixing portion 111 is increased, and the to-be-fixed portion 5 is less likely to be deformed with respect to the fixing portion 111 in the twisting direction of the optical fiber 2. Accordingly, the fiber holder 3 can be stably fixed to the fixing portion 111.

Further, in a state where the to-be-fixed portion 5 is fitted to the fitting recess 121, the exposed surface 11 is positioned on substantially the same plane as the end surfaces 117. Therefore, the to-be-fixed portion 5 does not protrude downward beyond the fixing portion 111.

Accordingly, the ejector pin 108 can be stably attached to the driving plate 107 without interference between the to-be-fixed portion 5 and the driving plate 107.

Further, in the sensor 1 configured as described above, the engagement surface 15 is positioned to face the screw hole 120 in a state where the to-be-fixed portion 5 is fitted to the fitting recess 121. When the screw member 400 is screwed into the screw hole 120, one end of the screw member 400 is pressed against the engagement surface 15 and the to-be-fixed portion 5 is pressed against the fixing portion 111 (see FIG. 8). Further, the force of pressing the to-be-fixed portion 5 against the fixing portion 111 can be adjusted by adjusting the screwed state of the screw member 400 with respect to the screw hole 120. Thus, the fixing state of the to-be-fixed portion 5 with respect to the fixing portion 111 can be easily adjusted.

Figure 8:
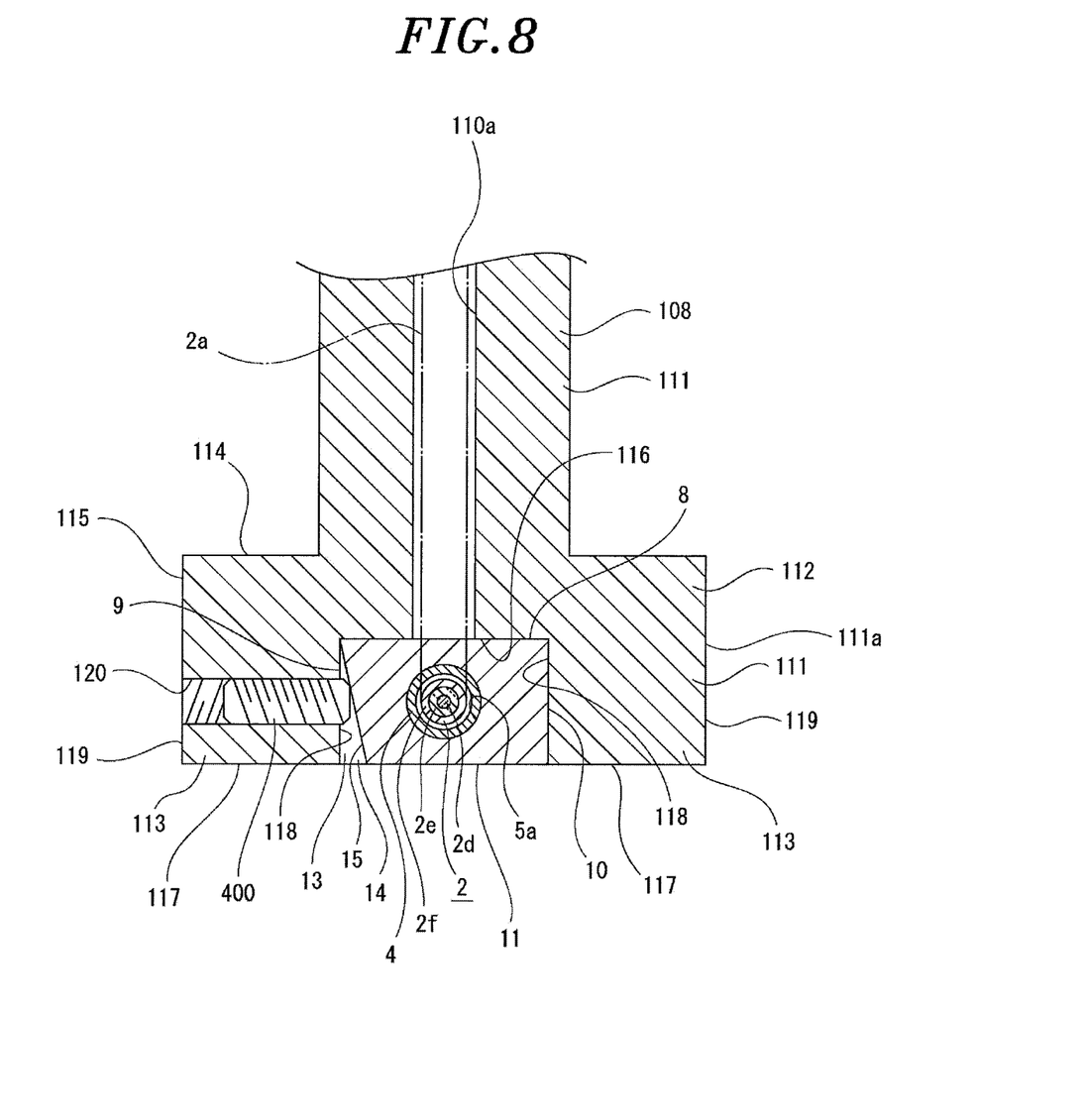
FIG. 8 is a cross-sectional view showing a state in which a screw member is pressed against an engagement surface.

Since the engagement surface 15 is pressed by the screw member 400 as described above, it is possible to prevent the to-be-fixed portion 5 from being separated from the fitting recess 121. Further, it is also possible to fix the to-be-fixed portion 5 to the fixing portion 111 by means of welding, adhesion, or the like, in a state where the to-be-fixed portion 5 is positionally aligned with respect to the fixing portion 111. Accordingly, the to-be-fixed portion 5 can be easily and reliably fixed to the fixing portion 111.

Further, the engagement surface 15 is sloped to be close to the side surface 118 where the screw hole 120 is formed as it slopes toward the bottom surface 116 in a state where the to-be-fixed portion 5 is fitted to the fitting recess 121. Therefore, when the screw member 400 is screwed into the screw hole 120 and the screw member 400 is pressed against the engagement surface 15, the flat surface 10 and the fiber lead-out surface 8 of the to-be-fixed portion 5 are pressed against the side surface 118 where the screw hole 120 is not formed and the bottom surface 116, respectively. Since the to-be-fixed portion 5 can be fixed to the fixing portion 111 in a state where the to-be-fixed portion 5 is stably fitted to the fitting recess 121, it is possible to reliably fix the to-be-fixed portion 5 to the fixing portion 111.

As an example of the screw member 400, a screw having only a shaft portion with no head is used, for example. Therefore, the other end of the screw member 400 does not protrude beyond the protruding portion peripheral surface 119. Accordingly, the ejector pin 108 can be stably attached to the driving plate 107 without interference between the screw member 400 and the driving plate 107.

As described above, the sensor 1 is fixed to the fixing portion 111 in a state where the to-be-fixed portion 5 is fitted to the fitting recess 121 formed at the fixing portion 111 of the ejector pin 108. Therefore, when the ejector pin 108 is moved with respect to the movable element 101, the fiber holder 3 is less likely to be deformed with respect to the fixing portion 111 in the twisting direction of the optical fiber 2. Accordingly, the optical fiber 2 is less likely to be twisted, and the damage caused by the twisting of the optical fiber 2 can be prevented.

Figure 9:
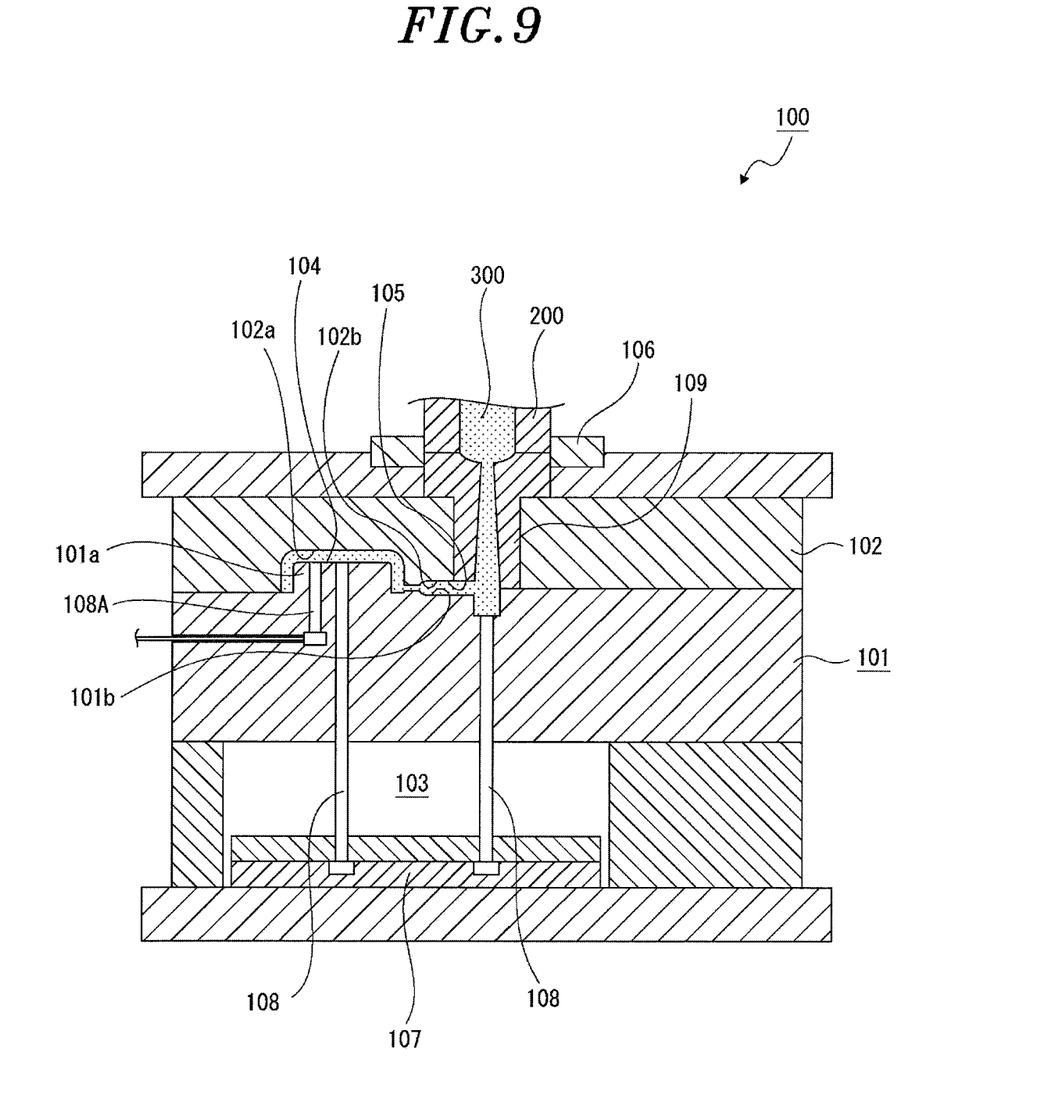
FIG. 9 is a cross-sectional view showing an example of an injection mold having a cylindrical member in addition to the ejector pin as a cable insertion member.

Further, although the example in which the sensor 1 is fixed to the ejector pin 108 serving as the cable insertion member in the mold 100 has been described, it is also possible to provide a cylindrical member 108A in addition to the ejector pin 108 in the mold 100 to be used as the cable insertion member (see FIG. 9). In this case, it is possible to provide the cable insertion member that is not moved with respect to the movable element 101. Accordingly, the sensor 1 can perform stable sensing.

The invention claimed is:

1. A sensor installed into a mold including a cable insertion member having a fixing portion with a fitting recess, the sensor comprising:
    an optical fiber, a part of which is bendable; and
    a fiber holder having a fiber insertion portion through which the optical fiber is inserted and a to-be-fixed portion extending from the fiber insertion portion,
    wherein the to-be-fixed portion is fixed to the fixing portion while being fitted to the fitting recess,
    wherein the fitting recess has two flat side surfaces facing each other and a bottom surface having both edges extending from the two side surfaces,
    the to-be-fixed portion has two flat surfaces, and
    the two side surfaces are in contact with the two flat surfaces, respectively.

2. The sensor of claim 1, wherein the fiber insertion portion and the to-be-fixed portion are integrally formed.

3. The sensor of claim 1, wherein the fiber insertion portion and the to-be-fixed portion are provided as separate members and the fiber insertion portion is joined to the to-be-fixed portion.

4. The sensor of claim 1, wherein the to-be-fixed portion has an engagement surface,
    the fixing portion has a screw hole that extends and is open toward one of the two side surfaces, and
    the to-be-fixed portion is fixed to the fixing portion by pressing a screw member screwed into the screw hole against the engagement surface.

5. The sensor of claim 4, wherein the engagement surface is sloped to be close to said one of the two side surfaces, as the engagement surface slopes toward the bottom surface in a state where the to-be-fixed portion is fitted to the fitting recess.

6. The sensor of claim 1, wherein an ejector pin is used as the cable insertion member.

7. The sensor of claim 2, wherein an ejector pin is used as the cable insertion member.

8. The sensor of claim 3, wherein an ejector pin is used as the cable insertion member.

* * * * *